(12) United States Patent
Woda et al.

(10) Patent No.: US 8,744,917 B2
(45) Date of Patent: Jun. 3, 2014

(54) METHOD, SYSTEM AND COMPONENTS FOR OBTAINING, EVALUATING AND/OR UTILIZING SELLER, BUYER AND TRANSACTION DATA

(75) Inventors: Steven L. Woda, Arlington, VA (US); Robert T. Kodey, Reston, VA (US); Marc Morel, Silver Spring, MD (US); Jeffrey E. Grass, Arlington, VA (US); Travis Brown, Washington, DC (US); Michael Beveridge, Potomac, MD (US)

(73) Assignee: BuySafe, Inc., Arlington, VA (US)

( * ) Notice: Subject to any disclaimer, the term of this patent is extended or adjusted under 35 U.S.C. 154(b) by 319 days.

(21) Appl. No.: 12/263,740

(22) Filed: Nov. 3, 2008

(65) Prior Publication Data

US 2009/0119160 A1 May 7, 2009

Related U.S. Application Data

(60) Provisional application No. 60/985,010, filed on Nov. 2, 2007.

(51) Int. Cl.
*G06Q 30/00* (2012.01)
(52) U.S. Cl.
USPC .......................................... 705/26.1
(58) Field of Classification Search
None
See application file for complete search history.

(56) References Cited

U.S. PATENT DOCUMENTS

| | | | |
|---|---|---|---|
| 6,519,571 B1 | 2/2003 | Guheen et al. | |
| 6,549,888 B1 | 4/2003 | Aieta et al. | |
| 6,839,689 B2 | 1/2005 | Aieta et al. | |
| 7,343,339 B2 | 3/2008 | Harrison, Jr. et al. | |
| 7,644,019 B2 | 1/2010 | Woda et al. | |
| 7,668,950 B2* | 2/2010 | Horowitz et al. | 709/223 |
| 2001/0039524 A1 | 11/2001 | Harrison, Jr. et al. | |
| 2002/0103750 A1 | 8/2002 | Herzfeld | |
| 2003/0033240 A1 | 2/2003 | Balson et al. | |
| 2003/0101099 A1 | 5/2003 | Sheltz et al. | |
| 2003/0130883 A1 | 7/2003 | Schroeder et al. | |
| 2003/0163411 A1 | 8/2003 | Sato | |
| 2003/0163704 A1 | 8/2003 | Dick et al. | |
| 2004/0019908 A1 | 1/2004 | Williams et al. | |
| 2004/0054784 A1* | 3/2004 | Busch et al. | 709/228 |
| 2004/0133471 A1 | 7/2004 | Pisaris-Henderson et al. | |

(Continued)

FOREIGN PATENT DOCUMENTS

| | | |
|---|---|---|
| WO | WO 02/25400 | 3/2002 |
| WO | WO 02/101507 | 12/2002 |

OTHER PUBLICATIONS

Notice of Allowance for U.S. Appl. No. 12/263,778 mailed May 30, 2013.
U.S. Appl. No. 13/958,758, filed Aug. 5, 2013, Woda et al.

(Continued)

*Primary Examiner* — Paul Danneman
(74) *Attorney, Agent, or Firm* — Jason H. Vick; Sheridan Ross, PC

(57) ABSTRACT

Methodologies, systems, components and software are provided that perform web analytics to measure visitor to consumer conversion continuously throughout surfing, through conversion and past completion of a purchase on-line. In accordance with at least one embodiment, such methodologies, systems, components and software may be utilized to determine efficacy of a plurality of parameters relating to one or more Transaction Related Offerings (TROs). In accordance with at least one embodiment of the invention, such methodologies, systems, components and software may be utilized to configure one or more Consumer Behavior Decision Models (CBDMs) and/or generate consumer behavior data.

31 Claims, 5 Drawing Sheets

(56) References Cited

U.S. PATENT DOCUMENTS

| | | | |
|---|---|---|---|
| 2004/0139032 A1 | 7/2004 | Rowan | |
| 2004/0204989 A1 | 10/2004 | Dicker et al. | |
| 2004/0220866 A1 | 11/2004 | Marlowe-Noren | |
| 2005/0060228 A1 | 3/2005 | Woo | |
| 2005/0144052 A1 | 6/2005 | Harding et al. | |
| 2005/0149388 A1 | 7/2005 | Scholl | |
| 2005/0222906 A1 | 10/2005 | Chen | |
| 2005/0268100 A1* | 12/2005 | Gasparini et al. | 713/170 |
| 2006/0041536 A1 | 2/2006 | Scholl et al. | |
| 2006/0106665 A1 | 5/2006 | Kumar et al. | |
| 2006/0190336 A1 | 8/2006 | Pisaris-Henderson et al. | |
| 2007/0083761 A1 | 4/2007 | Bunter et al. | |
| 2008/0103887 A1* | 5/2008 | Oldham et al. | 705/14 |
| 2008/0140491 A1* | 6/2008 | Jain et al. | 705/8 |
| 2008/0270209 A1 | 10/2008 | Mauseth et al. | |
| 2009/0063303 A1 | 3/2009 | Doll | |
| 2009/0119161 A1 | 5/2009 | Woda et al. | |
| 2009/0307028 A1 | 12/2009 | Eldon et al. | |
| 2011/0078044 A1 | 3/2011 | Gutierrez | |
| 2013/0204744 A1 | 8/2013 | Grass et al. | |

OTHER PUBLICATIONS

Loebbecke, Claudia et al. "Increasing Trust in e-Commerce: Concepts and Examples of Insurance Solutions" Department of Media Management, University of Cologne, 14th Bled Electronic Commerce Conference, Bled, Solvenia, Jun. 25-26 2001, pp. 1-18.
"Trusted Shops—How It Works" http://web.archive.org/web/20010622085640/http://www.trustedshops.com/en/consumers/hot_it_works_en.html, printed Mar. 15, 2012.
Official Action for U.S. Appl. No. 12/263,778, mailed Aug. 23, 2011.
Official Action for U.S. Appl. No. 12/263,778, mailed Mar. 1, 2012.
Auction Patrol "Auction Resources: Harp Auctioneers and Valuers—Independent Provincial Auction Rooms" http:www.auctionpatrol.com/Auction_Resources/more2.html; 2001-2004; 7 pages.
Brickley, Peg, "SuretyBond Guarantees Online Deals Get Done" Suretybond.com; LocalBusiness.com; 2000, 2 pages.
Business Wire "CorpHQ Announces E-Commerce Partnership with Contractors Bonding and Insurance Co." Mar. 26, 1999, 2 pages.
Business Wire "Repeat/Esurance Secures $34 Million in Second Round of Financing; First Multi-State Internet Insurance Company Receives Funding from Prominent Silicon Valley Venture Capital Firms" Dec. 6, 1999, 1 page.
Business Wire "Safeco's Innovative 'Surety Online' System Processes Bonds from Start to Finish; Utilizes Leading e-Process Technology from JetForm to Build Integrated System" Nov. 1, 2000, 2 pages.
Business Wire "Way2Bid, Inc. and Surety 2000 Corp. Announce Joint Efforts in Online Purchasing/Bonding" Nov. 30, 2000, 2 pages.
Business Wire "BuyBidWin.com Offers SatisFusion's After Support Platform on its E-Store Front" http://www.prnewswire.com; Dateline: Long Beach, Calif., May 8, 2001.
CNA Surety: Bondline; http://web.archive, org/web/199910130023l2/http://cnasurety.com/; printed Nov. 18, 2004; 2 pages.
CNA Surety "Bondline: An Innovative Technology-Based Service from CNA Surety" http://www.web-archive.org/web/20000920014340/www.westernsurety.com/bondline/; printed Nov. 18, 2004; 1 page.
CNA Surety "Demos" http://www.cnasurety.com/services/demos.htm; printed Nov. 18, 2004; 2 pages.
CNA Surety "InSure Vision Technologies" http://www.cnasurety.com/services/InSurevision.htm; printed Nov. 18, 2004, 2 pages.
DoveBid "Dovebid® Announces Seven New Transaction Support Services" http://www.dovebide.com/company/news/pr_000906_transaction.asp; Sep. 6, 2000; 4 pages.
Esuretybond.com "About Esuretybond.com"; http://esuretybond.com/about_esuretybond.htm; printed Jul. 2, 2003.
Fitzgerald, John B., et al. "Principles of Suretyship" vol. II; Insurance Institute of America; First Edition 1991, pp., 103-104.
Gassen, Timothy "Robby the Robot Would Marvel at How He is Sold" Arizona Daily Star, Tucson, Arizona, Feb. 22, 1999, p. 7E; 3 pages.
Get Coverage "Application for WebTradeInsure Insurance" http://web.archive.org/web/20000619212149/www.webtradeinsure.com/ . . . ; printed Feb. 10, 2005; 3 pages.
Great American Insurance's Electronic Surety: Online Notary Bonds; www.electronicsurety.com/Electronicsurety/default.asp; printed Jul. 2, 2003.
Hix, Nancy L. "Before the Auction: Understanding Insurance" AW Daily—Tips & Tactics; http://vvww.vendio.com/service/tipsandtactics/buy-insurance.html; 1998-2005; 3 pages.
HTFD Financial Services Group Inc., "Its All About Time: Selling Fidelity and Surety Bonds is About to Get a Lot Faster for Agents" Agent Magazine, Jan./Feb. 1999, 2 pages.
HTFD Financial Services Group Inc. "New Bond System Goes One Step Beyond" Agent Magazine, Jan./Feb. 1999, 1 page.
Insurance Journal—National News "Esurety Launches Agent Web Site" http://www.insurancejournal.com/new/national/2000/07/18/11203.htm; Jul. 18, 2000, 2 pages.
Insurance Journal—National News "E-Surety.net Unveils Surety Bond Site" May 11, 2000; http://wvvw.insurancejournal.com/news/national/2000/05/11/11012.htm; 2 pages.
Insurance Journal—West News "Calif. Company Offers Coverage for Online Auction Purchases" http://www.insurancejournal.com/news/west/2000/07/28/12068.htm; Jul. 28, 2000; 1 page.
InSure Vision "About IVT—Corporate Overview" http://vvww.insurevision.com/corpprofile.htm; 1999-2000, 1 page.
InSure Vision "InSure Vision Technologies, LLC Announces Alliance with CNA Surety" http://www.insurevision.com/PressRelease/prcna10-29-1999.htm; Oct. 28, 1999. 1 page.
InSure Vision "InSure Vision Technologies, LLC Announces the Opening of East Coast Office" http://www.insurevision.com/pressrelease/prbaltoffc01-05-2000.htm; Jan. 5, 2000, 1 page.
InSure Vision "InSure Vision Technologies, LLC Releases SurePath 1.3" Jul. 5, 2000, 1 page.
InSure Vision "Insure Vision Technologies, LLC Welcomes Aboard Thomas Rutherfoord, Inc." http://www.insurevision.com/PressRelease/prRutherfoord12-29-99.htm; Dec. 19, 1999, 1 page.
InSure Vision "News Archive" http://www.insurevision.com/newsArchive.htm; Oct. 28, 1999-Nov. 27, 2000, 1 page.
InSure Vision "SurePath—Demo—FAQs" http://web.archive.org/web/20000101701l200/www.insurevision.com/faq.htm; Feb. 9, 2005; 3 pages.
InSure Vision "SurePath—Demo—Products" http://web.archive.org/web/200001204160000/insurevision.com/products2/htm; Feb. 9, 2005, 1 page.
InSure Vision "SurePath—Surety Bond Processing" http://web.archive.org/web/20000302194816/insurevision.com/corpprofi . . . ; Feb. 9, 2005, 1 page.
InSure Vision, "Welcome to IVT" http://www.insurevision.com; Sep. 15, 2003, 1 page.
InSure Vision, "What's New" News Archive, http://www.insurevision.com.news.htm; Feb. 12, 2001-Sep. 15, 2003, 1 page.
InSure Vision, "What's New" News Release, Oct. 28, 1999-Mar. 20, 2000; http://web.archive.org/web/20000601130439/insurevision.com/news.htm; 1 page.
InSure Vision Technologies Presents "SurePath and SureForm 'The Bonding of Tradition and Technology'" http://web.archive.org/web/2000030218434/http://insurevision.com; printed Feb, 9, 2005; 2 pages.
Internet Archive Wayback Machine, 2001, 5 pages.
Internet Archive Wayback Machine, http://webtradeinsure.com; 2001, 1 page.
Look Smart—Find Articles, "Marsh Debuts Online Guarantee Program" www.findarticles.com/p/articles/mi_m0BJK/is_14_11/ai_67315633; Nov. 9, 2004, 2 pages.
Marrison, Chris "Risk Measurement for Project Finance Guarantees" Journal of Project Finance, New York, Summer 2001, vol. 7, Iss. 2, pp. 43-54.

(56) References Cited

OTHER PUBLICATIONS

Mittleman, Kelly "Online Insurance: Auction Sites Still Hesitate to Provide Services for Wary Consumers" Antiques and the Arts Online; http://www.antiquesandthearts.com/AnatomyLession. asp?d=Archive20 . . . ; Feb. 11, 2005, 2 pages.
Purchasing.Com "Net Services" http://wvvw.purchasing.com/article/CA139426.html; Aug. 24, 2000; 2 pages.
Rothke, Ben "On the Cutting Edge: Alice Doesn't Sign Here Anymore" Information Security Magazine; http://infosecuritymag.techtarget.com/articles/august00/departments3_n . . . ; Aug. 2000, 8 pages.
Simplebound Insurance Services, "Online Surety Bond Applications"; http://www.simplebond.com; Printed Jun. 12, 2003; 3 pages.
South Coast Surety Insurance Services Inc.; http://southcoastsurety.com; printed Jul. 2, 2003.
Steiner, Ina "This & That: 1) Online Auction Insurance" This & That; Dec. 3, 2000, 2 pages.
Suretybond.com; 2000, 1 page.
Suretybond.com; "How Does Suretybond.com Benefit Exchanges" 2000, 2 pages.
The Bond Agency.com; http://thebondafency.com; printed Jul. 2, 2003.
The Hartford Group, Inc., "New Bond System Goes One Step Beyond" Jan. 2001, 4 pages.
Tradesafe.com "Being a Seller—Being a Buyer" 1999-2000, 4 pages.
Tradesafe.com "Buyer's Guide" 1999-2000, 1 page.
Tradesafe.com "Commercial Surety" Jan./Feb. 1999, 1 page.
Tradesafe.com; "The Company: Tradesafe.com—Empowering Sellers and Protecting Buyers"; tradesafe.com; 1999-2000; 3 pages.
Tradesafe.com "Frequently Asked Questions: What is 1StepSurety?" Jan. /Feb. 1999, 3 pages.
Tradesafe.com "Internet Archive WayBackMachine" 2001, 1 page.
Tradesafe.com "Tradesafe.com™ Chosen by AuctionWatch.com to Provide Guaranteed Payment Service for Online Buyers and Sellers" New Release, Jul. 25, 2000, 2 pages.
Tradesafe.com "Tradesafe.com™ Chosen by Lycos to Provide Online Escrow Service" News Release, Oct. 1, 1999, 2 pages.
Tradesafe.com "TradeSafe Online Corporation" 1995-1999; 1 page.
Tradesafe.com "Opoly Enterprises Teams with Tradesafe.com™ to Protect Users Against Online Frauds" New Release, Apr. 25, 2000, 2 pages.
Tradesafe.com "Tradesafe.com™ Partners with Online Auction Site boxLot.com for On-Line Payment Service" New Release, Dec. 17, 1999, 2 pages.
Tradesafe.com "The Tradesafe Payments Guarantee" 1999-2000, 2 pages.
Tradesafe.com "Tradesafe.com™ Receives $10 Million in Venture Funding from Germany's IQ Capital" New Release, Mar. 13, 2000, 2 pages.
Tradesafe.com "Sellers Guide", 1999-2000, 2 pages.
Tradesafe.com "Transactions over $1200" 1999-2000, 2 pages.
Tradesafe.com "Welcome to Tradesafe Payments!" 1999-2000, 2 pages.
Tradesafe.com "What is 1StepSurety?—Systems Requirements/Frequently Asked Questions" Jan./Feb. 1999, 1 page.
Tradesafe.com "Why are we Special" Jan./Feb. 1999, 1 page.
Trebilcock, Bob "Don't Get Scammed on the Internet" Good Housekeeping, Sep. 1998, v. 227.3, p. 161-162.
Web Trade Insure "About WebTradeInsure" http://web.archive.org/web/20000407174703/http://www.webtradeinsure . . . ; printed Feb. 10, 2005, 1 page.
Web Trade Insure "Auction Sites" http://web.archive.org/web/20010208094919/www.webtradeinsure.com/ . . . ; printed Feb. 10, 2005; 1 page.
Web Trade Insure "Frequently Asked Questions" http://web.archive.org/web/200001102115648/www.webtradeiunsure.com/ . . . ; printed Feb. 10, 2005, 1 page.

Web Trade Insure "Sellers" http://web.archive.org/web/20010208104347/www.webtradeinsure.com/ . . . ; printed Feb. 10, 2005; 2 pages.
Western Surety Company: BondLine; http://web.archive.org/web/19980713094857/westernsurety.com/bondline/bondline_body.htm; printed Nov. 18, 20014; 2 pages.
Wli BuyerAssurance.com "Online Incentives Boost Revenue, Turning e-Commerce Browsers into Loyal Customers-Customized, Branded Instant Rewards Differentiate Online Merchant's Web Site with Best Price Guarantees, Extended . . . " Business Wire Wednesday, Oct. 1, 2003.
International Search Report for International Application No. PCT/US2004/010109, mailed Feb. 5, 2007.
Written Opinion for International Application No. PCT/US2004/010109, mailed Feb. 5, 2007.
International Preliminary Report on Patentability for International Application No. PCT/US2004/010109, mailed Feb. 20, 2007.
European Search Report for European Patent Application No. 04759790.1, mailed Jun. 6, 2012.
Official Action for European Patent Application No. 04759790.1, mailed Sep. 25, 2012.
International Search Report for International Application No. PCT/US2013/024632, mailed Apr. 19, 2013.
Written Opinion for International Application No. PCT/US2013/024632, mailed Apr. 19, 2013.
Official Action (Restriction Requirement) for U.S. Appl. No. 10/419,269, mailed Apr. 7, 2008.
Official Action for U.S. Appl. No. 10/419,269, mailed Mar. 5, 2009.
Official Action for U.S. Appl. No. 10/419,269, mailed Jul. 20, 2009.
Notice of Allowance for U.S. Appl. No. 10/419,269, mailed Oct. 30, 2009.
Official Action for U.S. Appl. No. 13/758,706, mailed Jun. 21, 2013.
Notice of Allowance for U.S. Appl. No. 13/758,706, mailed Dec. 6, 2013.
Plaintiff's Complaint for Patent Infringement (USPN 7,644,019), *buySAFE, Inc.* vs. *Google Inc.*, U.S. District Court, for the District of Delaware, Civil Action No. 1:11-cv-01282-UNA, filed Dec. 22, 2011, 45 pages.
Google Inc.'s Disclosures Pursuant to Paragraph 3 of the Default Standard for Discovery Including Discovery of Electronically Stored Information ("ESI"), *buySAFE, Inc.* vs. *Google Inc.*, U.S. District Court, for the District of Delaware, Civil Action No. 11-1282-LPS, filed May 16, 2012, 4 pages.
Google Inc.'s Initial Disclosures Pursuant to Federal Rule of Civil Procedure 26(A)(1), *buySAFE, Inc.* vs. *Google Inc.* U.S. District Court, for the District of Delaware, Civil Action No. 11-1282-LPS, filed May 16, 2012, 6 pages.
Google Inc.'s Notice of Service, *buySAFE, Inc.* vs. *Google Inc.*, U.S. District Court, for the District of Delaware, Civil Action No. 11-1282-LPS, filed Jun. 22, 2012, 3 pages.
Google Inc.'s Objections and Responses to Plaintiff Buysafe, Inc.'s First Set of Interrogatories (No. 1-8) *buySAFE, Inc.*, vs. *Google Inc.*, U.S. District Court, for the District of Delaware, Civil Action No. 11-1282-LPS, filed Jun. 22, 2012, 8 pages.
Google Inc.'s Objections and Responses to Plaintiff Buysafe, Inc.'s First Requests for Production, *buySAFE, Inc.*, vs. *Google Inc.*, U.S. District Court, for the District of Delaware, Civil Action No. 11-1282-LPS, filed Jun. 22, 2012, 38 pages.
Buysafe, Inc.'s Initial Disclosures, *buySAFE, Inc.*, vs. *Google Inc.*, U.S. District Court, for the District of Delaware, Civil Action No. 11-1282-LPS, filed May 16, 2012, 9 pages.
Letter From P. Gupta to Google Counsel J. Mancini Re Google's Affirmative Defenses, *buySAFE, Inc.*, vs. *Google Inc.*, U.S. District Court, for the District of Delaware, Civil Action No. 11-1282-LPS, dated Mar. 2, 2012, 2 pages.
Stipulation and [Proposed] Order Extending Fact Discovery Deadline, *buySAFE, Inc.*, vs. *Google Inc.*, U.S. District Court, for the District of Delaware, Civil Action No. 11-1282-LPS, filed Mar. 27, 2013, 1 page.
Plaintiff Buysafe, Inc.'s Brief in Opposition to Defendant Google Inc.'s Opening Claim Construction Brief, *buySAFE, Inc.*, vs. *Google Inc.*, U.S. District Court, for the District of Delaware, Civil Action No. 11-1282-LPS, dated Sep. 7, 2012, 21 pages.

(56) References Cited

OTHER PUBLICATIONS

Buysafe, Inc.'s Claim Construction Hearing Brief, 30 pages.
Plaintiff Buysafe'S Opening Claim Construction Brief, *buySAFE, Inc.*, vs. *Google Inc.*, U.S. District Court, for the District of Delaware, Civil Action No. 11-1282-LPS, dated Aug. 10, 2012, 22 pages.
Google Inc.'s Identification of Terms, Phrases, and Clauses for Early Claim Construction, *buySAFE, Inc.*, vs. *Google Inc.*, U.S. District Court, for the District of Delaware, Civil Action No. 11-1282-LPS, dated Jul. 2, 2012, 3 pages.
Defendant Google's Opening Claim Construction Brief, *buySAFE, Inc.*, vs. *Google Inc.*, U.S. District Court, for the District of Delaware, Civil Action No. 11-1282-LPS, dated Aug. 10, 2012, 25 pages.
Exhibit 1 (US Patent 7,644,019) to Defendant Google's Opening Claim Construction Brief, *buySAFE, Inc.*, vs. *Google Inc.*, U.S. District Court, for the District of Delaware, Civil Action No. 11-1282-LPS, dated Aug. 10, 2012, 36 pages.
Exhibit 2 (Prosecution History for the '019 Patent) to Defendant Google's Opening Claim Construction Brief, *buySAFE, Inc.*, vs. *Google Inc.*, U.S. District Court, for the District of Delaware, Civil Action No. 11-1282-LPS, dated Aug. 10, 2012, 85 pages.
Exhibit 3 (A Dictionary of Model Legal Usage, Bryan Garner Ed, (2D Ed. Oxford University Press 1995)) to Defendant Google's Opening Claim Construction Brief, *buySAFE, Inc.*, vs. *Google Inc.*, U.S. District Court, for the District of Delaware, Civil Action No. 11-1282-LPS, dated Aug. 10, 2012, 4 pages.
Exhibit 4 (Eric T. Laity, "The United States' Response to Tax Havens: The Foreign Base Company Services Income of Controlled Foreign Corporations," 18 Nw. J. Int'l L. & Bus. 1, 7 and 16 (1997-1998)) To Defendant Google's Opening Claim Construction Brief, *buySAFE, Inc.* vs. *Google Inc.*, U.S. District Court, for the District of Delaware, Civil Action No. 11-1282-LPS, dated Aug. 10, 2012, 49 pages.
Exhibit 5 (Collins English Dictionary (Harpercollins 2009)) To Defendant Google's Opening Claim Construction Brief, *buySAFE, Inc.* vs. *Google Inc.*, U.S. District Court, for the District of Delaware, Civil Action No. 11-1282-LPS, dated Aug. 10, 2012, 5 pages.
Exhibit 6 (Encyclopedia Britannica 2008) To Defendant Google's Opening Claim Construction Brief, *buySAFE, Inc.* vs. *Google Inc.*, U.S. District Court, for the District of Delaware, Civil Action No. 11-1282-LPS, dated Aug. 10, 2012, 2 pages.
Exhibit 7 (Black's Law Dictionary, 6th Ed., West Group 1990) To Defendant Google's Opening Claim Construction Brief, *buySAFE, Inc.* vs. *Google Inc.*, U.S. District Court, for the District of Delaware, Civil Action No. 11-1282-LPS, dated Aug. 10, 2012, 12 pages.
Exhibit 8 (Dictionary.com Based on Random House Dictionary) To Defendant Google's Opening Claim Construction Brief, *buySAFE, Inc.* vs. *Google Inc.*, U.S. District Court, for the District of Delaware, Civil Action No. 11-1282-LPS, dated Aug. 10, 2012, 2 pages.
Exhibit 9 (Black's Law Dictionary, 2nd Pocket Ed., Bryan Garner, Ed., (West Group 2001)) To Defendant Google's Opening Claim Construction Brief, *buySAFE, Inc.* vs. *Google Inc.*, U.S. District Court, for the District of Delaware, Civil Action No. 11-1282-LPS, dated Aug. 10, 2012, 6 pages.
Defendant Google's Answering Claim Construction Brief, *buySAFE, Inc.* vs. *Google Inc.*, U.S. District Court, for the District of Delaware, Civil Action No. 11-1282-LPS, dated Sep. 7, 2012, 15 pages.
Judgment in a Civil Case—in Favor or Defendant, *buySAFE, Inc.* vs. *Google Inc.*, U.S. District Court, for the District of Delaware, Civil Action No. 11-1282-LPS, dated Aug. 19, 2013, 1 page.
Defendant Google's Opening Brief in Support of Its Motion for Judgment on the Pleadings, *buySAFE, Inc.* vs. *Google Inc.*, U.S. District Court, for the District of Delaware, Civil Action No. 11-1282-LPS, dated Jul. 9, 2012, 23 pages.
Defendant Google's Reply Brief in Support of Its Motion for Judgment on the Pleadings, *buySAFE, Inc.* vs. *Google Inc.*, U.S. District Court, for the District of Delaware, Civil Action No. 11-1282-LPS, dated Aug. 31, 2012, 13 pages.
Plaintiff Buysafe, Inc.'s Opposition to Google, Inc.'s Motion for Judgment on the Pleadings, *buySAFE, Inc.* vs. *Google Inc.*, U.S. District Court, for the District of Delaware, Civil Action No. 11-1282-LPS, dated Aug. 10, 2012, 21 pages.
Buysafe, Inc.'s Presentation at October 26, 2012 Hearing, *buySAFE, Inc.* vs. *Google Inc.*, U.S. District Court, for the District of Delaware, Civil Action No. 11-1282-LPS, 16 pages.
Buysafe, Inc.'s Tutorial at 101 & Markman Hearing, *buySAFE, Inc.* vs. *Google Inc.*, U.S. District Court, for the District of Delaware, Civil Action No. 11-1282-LPS, 17 pages.
Brief for Plaintiff—Appellant Buysafe, Inc., *buySAFE, Inc.* vs. *Google Inc.*, U.S. District Court, for the District of Delaware, Civil Action No. 11-1282-LPS, dated Oct. 21, 2013, 88 pages.
Brief for Defendant—Appellee Google, Inc., *buySAFE, Inc.* vs. *Google Inc.*, U.S. District Court, for the District of Delaware, Civil Action No. 11-1282-LPS, dated Dec. 5, 2013, 66 pages.
Reply Brief for Plaintiff—Appellant Buysafe, Inc., *buySAFE, Inc.* vs. *Google Inc.*, U.S. District Court, for the District of Delaware, Civil Action No. 11-1282-LPS, dated Dec. 23, 2013, 30 pages.
Plaintiff's Complaint for Patent Infringement (USPN 8,515,791), *buySAFE, Inc.* vs. *Google Inc.*, U.S. District Court, for the Eastern District of Virginia—Richmond Division, Civil Action No. 3:13-cv-00781-HEH, filed Nov. 25, 2013, 8 pages.
Defendant Google Inc.'s Answer to Complaint, *buySAFE, Inc.* vs. *Google Inc.*, U.S. District Court, for the Eastern District of Virginia (Richmond Division), Civil Action No. 3:13-cv-00781-HEH, filed Jan. 27, 2014, 14 pages.
Google Inc.'s Motion to Transfer Venue Pursuant to 28 U.S.C § 1404(a), *buySAFE, Inc.* vs. *Google Inc.*, U.S. District Court, for the Eastern District of Virginia (Richmond Division), Civil Action No. 3:13-cv-781-HEH, filed Jan. 27, 2014, 4 pages.
Google Inc.'s Memorandum in Support of Its Motion to Transfer Venue Pursuant to 28 U.S.C. § 1404(a), *buySAFE, Inc.* vs. *Google Inc.*, U.S. District Court, for the Eastern District of Virginia (Richmond Division), Civil Action No. 3:13-cv-781-HEH, filed Jan. 27, 2014, 18 pages.
Buysafe, Inc.'s Memorandum in Opposition to Google's Motion to Transfer Venue Pursuant to 28 U.S.C. § 1404(a), *buySAFE, Inc.* vs. *Google Inc.*, U.S. District Court, for the Eastern District of Virginia (Richmond Division), Civil Action No. 3:13-cv-781-HEH, filed Feb. 10, 2014, 19 pages.
Declaration of Jeffrey E. Grass in Support of Buysafe's Opposition to Google's Motion to Transfer Venue Pursuant to 28 U.S.C. § 1404(a), *buySAFE, Inc.* vs. *Google Inc.*, U.S. District Court, for the Eastern District of Virginia (Richmond Division), Civil Action No. 3:13-cv-781-HEH, filed Feb. 10, 2014, 2 pages.
Google Inc.'s Reply in Support of Its Motion to Transfer Venue Pursuant to 28 U.S.C. § 1404(a), *buySAFE, Inc.* vs. *Google Inc.*, U.S. District Court, for the Eastern District of Virginia (Richmond Division), Civil Action No. 3:13-cv-781-HEH, filed Feb. 13, 2014, 130 pages.
Executed Memorandum Order—Denying Google Inc.'s Motion to Transfer Venue, *buySAFE, Inc.* vs. *Google Inc.*, U.S. District Court, for the Eastern District of Virginia (Richmond Division), Civil Action No. 3:13-cv-781-HEH, filed Feb. 14, 2014, 3 pages.
U.S. Appl. No. 14/191,806, filed Feb. 27, 2014, Woda et al.
U.S. Appl. No. 14/243,542, filed Apr. 2, 2014, Grass et al.

* cited by examiner

METHOD, SYSTEM AND COMPONENTS FOR OBTAINING, EVALUATING AND/OR UTILIZING SELLER, BUYER AND TRANSACTION DATA

This application claims the benefit of priority under 35 U.S.C. §120 from U.S. Provisional Patent Application No. 60/985,010, filed Nov. 2, 2007, which is hereby incorporated by reference in its entirety.

The invention relates in general to understanding consumer behavior relating to on-line purchase transactions. In particular, the invention relates to methods, systems, components and software for obtaining information throughout a period of time spanning from product search to post-purchase regarding on-line consumer behavior thereby improving management and assessment of the efficacy of delivery of Transaction Related Offerings (TROs) as well as improving modeling of consumer behavior, as specified in the independent claims.

BACKGROUND OF THE INVENTION

Conventional consumer behavior modelling practices have been used in retail sales to identify and implement advertising strategies that drive consumers' purchases. The relatively new area of on-line commerce, also known as Internet e-commerce, has become a well accepted mechanism for consumers, i.e., individuals who are considering the purchase of a good or service, to become customers by purchasing products from various sources through the Internet. This type of on-line commerce enables consumers to decide when they search for products, how they search for products, and how and where they buy those products without the inconvenience of physically visiting numerous different sellers' real-world locations to comparison shop.

In the on-line environment, consumer behavior modelling practices routinely integrate consumer data with behavioral metrics and demographic information from third-party providers. With this data, advertisers and advertising channel providers can define and select populations of consumers, use data mining to build predictive models, and score consumers and consumer demographic groups based on relevant criteria. As a result of such predictive modeling, advertisers aim to determine which consumers are most likely to purchase products, services, take a desired action (e.g. a registration/sign-up) or respond to specific advertisements, which consumer segments maximize Return On Investment (ROI) on advertising campaigns and which consumers are at risk of attrition. Moreover, predictive models are conventionally used for consumer profiling and consumer modelling to predict consumer responses to marketing and sales campaigns, identify cross-selling and up-selling opportunities, manage consumer attrition and perform consumer valuations.

As a result of on-line commerce, sellers may increase their number of on-line transactions by, for example, increasing their visibility to visitors through advertising. This is often performed by purchasing sponsored searches, or paid searches, which are a type of contextual advertising where web-site owners pay an advertising fee, usually based on click-throughs or advertisement views to have their web-site search results shown in top placement on search engine result pages.

Sellers may also increase their number of on-line transactions by, for example, improving the shopping and purchase experience for consumers in their on-line environment, e.g., their on-line storefront or market place. Additionally, sellers may also increase their number of on-line transactions by increasing the actual or perceived benefit or value to the buyer through Transaction Related Offerings (TROs) such as price modifications, free shipping, bonded transactions, warranties, coupons, etc.

However, conducting conventional buyer behavior modelling practices in e-commerce requires measuring transaction volumes in a verifiable, consistent and reliable (and scalable) way and evaluating a measured transaction volume and associated data when various TROs are implemented to determine those the impact of the TROs on buyer behavior. For example, determining the impact of offering bonding on the purchase of an expensive piece of electronics equipment or the impact of free shipping for lawn furniture purchased on-line requires a comparison of the volume of on-line purchases of those products with and without their associated TROs.

However, a significant limitation of such modeling is that, conventionally, transaction volume is not measured in a verifiable, consistent, reliable and scalable way. Rather, advertisers, advertising channel providers and sellers routinely equate the number of "clicks" occurring at a web-site with the degree of interest that a buyer has and, rather inappropriately, the likelihood that a buyer will become a satisfied customer. Thus, the success of a web-site is conventionally measured based on the number of unique visitors, hits, click-throughs, or page views. However, on-line commerce suffers from the problem that it is difficult to determine whether, for example, the number of clicks in fact may be used to consistently and reliably predict the likelihood that a buyer will enter into an on-line transaction.

Another conventionally known option for tracking visitor behavior is the tracking of keywords input to search engines to determine what is of interest to visitors of a particular web-site. For example, if a visitor types in the keywords "rear projection HDTV," it may be assumed that the visitor is looking to learn more about or purchase such a product. Therefore, search engine providers have access to a great deal of information regarding visitors' interests. Accordingly, search engine providers can provide data indicating what on-line buyers search on and where those buyers go based on search results. In turn, a particular seller can track what buyers do when they get to the seller's on-line environment, what their purchase rates and repeat business percentages are, etc.

However, access to such information is limited because search engines and particular sellers are not privy to buyers' activities using other search engines or while visiting other sellers' on-line environments; moreover, the period of time during which a buyer's click-stream (i.e., the virtual trail that a visitor leaves behind while surfing the Internet) or key words can be tracked is limited to that period prior to and including conversion (e.g., when a consumer becomes a customer as a result of a purchase of a product on-line).

SUMMARY OF THE INVENTION

The following presents a simplified summary in order to provide a basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to the more detailed description below.

In accordance with at least one embodiment of the invention, methodologies, systems, components and software are provided that are capable of performing analytics to measure activity relating to consumer-to-customer conversion continuously throughout surfing, through conversion and past completion of a purchase (or another desired action) on-line.

In accordance with at least one embodiment, such methodologies, systems, components and software may be utilized to determine efficacy of a plurality of parameters relating to one or more Transition Related Offerings (TROs).

In accordance with at least one embodiment of the invention, such methodologies, systems, components and software may be utilized to configure one or more Consumer Behavior Decision Models (CBDMs) and/or generate Consumer Behavior Data.

BRIEF DESCRIPTION OF THE DRAWINGS

A more compete understanding of the present invention and the utility thereof may be acquired by referring to the following description in consideration of the accompanying drawings, in which like reference numbers indicate like features, and wherein.

DETAILED DESCRIPTION OF THE INVENTION

Figure 1:
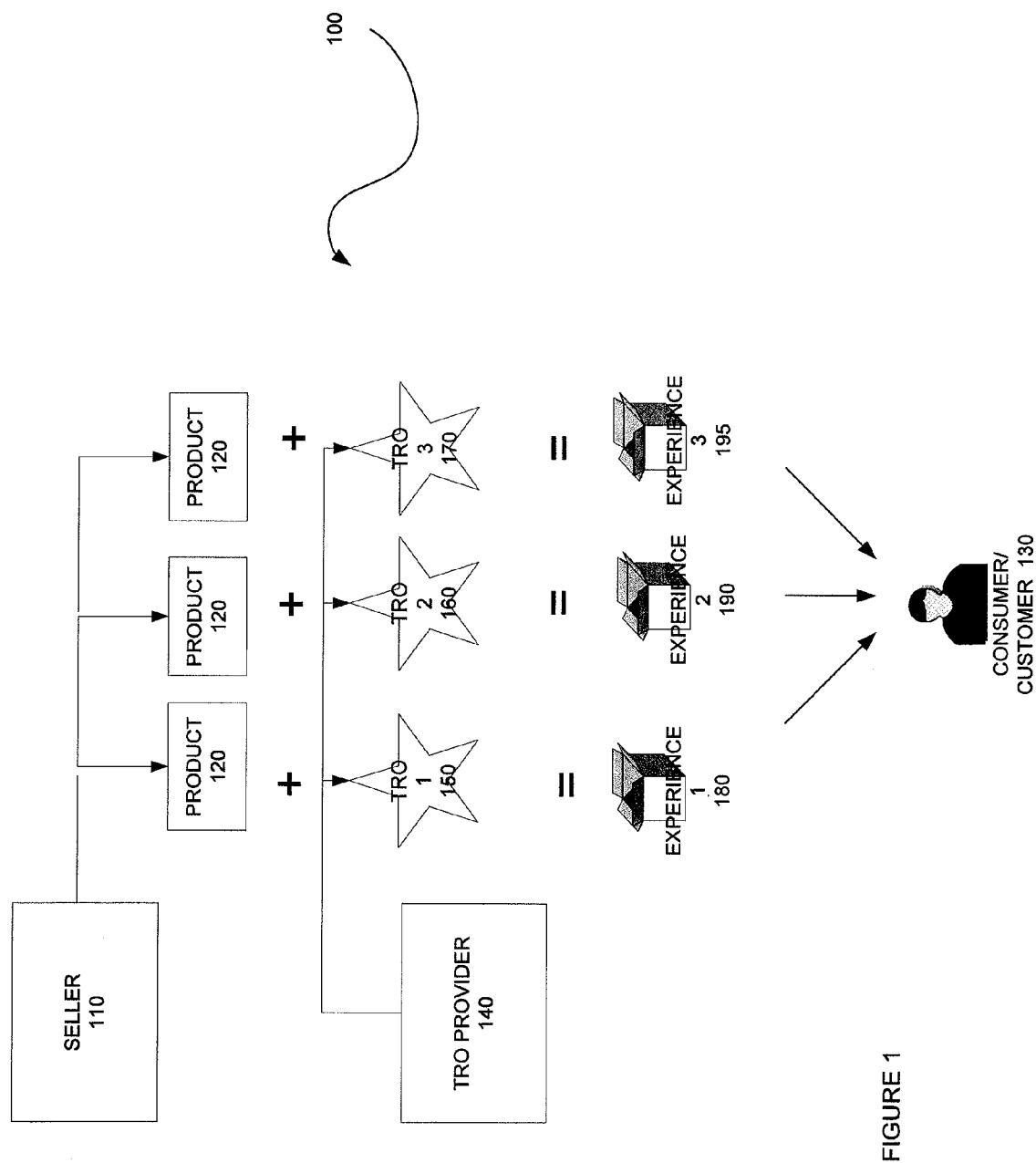
FIG. 1 illustrates a framework 100 in which a TRO provider provides a TRO for a transaction between a seller and a customer, in accordance with at least one embodiment of the invention.

In the following description of various invention embodiments, reference is made to the accompanying drawings, which form a part hereof, and in which is shown, by way of illustration, various embodiments in which the invention may be practiced. It is to be understood that other embodiments may be utilized and structural and functional modifications may be made without departing from the scope and spirit of the present invention.

Moreover, it should be understood that various connections are set forth between elements in the following description; however, these connections in general, and, unless otherwise specified, may be either direct or indirect, either permanent or transitory, and either dedicated or shared, and that this specification is not intended to be limiting in this respect.

Furthermore, there is at least some conflict of interest affect resulting from the fact that third party advertising providers are generally the entities monitoring and reporting on traffic patterns and conversion rates through the third party advertising provider; this is because that third party advertising provider also charges sellers based on that data.

Thus, advertisers, advertising channel providers and sellers remain incapable of effectively and reliably evaluating what business practices effectively convert consumers into customers. Instead, conventional marketing practices focus on quantitative metrics that are readily available like cost-per-click. Moreover, there is no mechanism for measuring and modelling consumer behavior beyond the completion of the transaction. Thus, the assumed relationship between a consumer's extensive browsing and their likelihood of purchasing an item is not fully verifiable because tracking of the consumer's click-stream is generally limited to various segments of surfing, that is, the click-stream is disconnected from the consumer's entry point to an on line commerce environment because there is no way to identify the starting point of a consumer's relationship/search/visit. Additionally, click-streams consistently end at the time that payment is tendered for a purchased item. A consumer's click-stream can include an indication of every website and every page of every website that the consumer visits; additionally, information may be gathered indicating any newsgroups that the consumer participates in and even the e-mail addresses of mail that the consumer sends and receives.

Moreover, although individual web-sites are capable of tracking a consumer's click-stream, they are only able to track it for a finite period of time through session or permanent cookies. Session cookies are limited to the period of time prior to the consumer closing their browser. Permanent or persistent cookies can be used collect identifying information about a consumer, such as web-surfing behavior or user preferences for a specific website; such cookies are stored on a consumer's hard drive either until it expires or is deleted by the consumer. Thus, sellers are limited by the length of time that they may collect data on a consumer.

Further, conventional web analytics and closed loop reporting capabilities are limited in scope because consumer behavior cannot be confidently monitored continuously regardless of where the consumer visits on the Internet and monitoring is limited to the period of time prior to and including conversion.

Accordingly, invention embodiments, methodologies, systems, components and software are provided that perform web analytics to measure consumer-to-customer activity continuously throughout surfing, through conversion and past completion of a purchase on-line.

Preliminarily, various terms shall be described to better enable one of ordinary skill in the art to fully understand the disclosed features of invention embodiments. The term "TRO," or Transaction Related Offering, as used herein, is meant to refer to any product or service of perceived or actual value that is provided to a consumer in connection with a transaction, such as an on-line transaction to purchase products or services, for at least the purpose of motivating the consumer to purchase products or services at the present time and/or in the future. Accordingly, a TRO may include but is not limited to a transaction performance guaranty, wherein a safe transaction service provider underwrites the obligations of the product or service provider to reduce risk to the consumer. Alternatively, the TRO may be of some other type, e.g., free shipping of a purchased product, a warranty for the product that is not automatically provided by the manufacturer, preferred or alternative product or service pricing, coupons or offers for additional products and/or services, etc. It should be appreciated that a TRO may be provided by a seller or by a TRO provider working on behalf of the seller either directly or indirectly.

At the outset of describing the utility of various invention embodiments, it should be understood that the infrastructure and ability to deliver TROs provides an opportunity to gather various types of otherwise unavailable data in connection with a consumer's purchase. As a result of the TRO provider's involvement in improving consumer-to-customer conversion rates and transaction fulfilment rates, the TRO provider may have access to various information that are not available in conventional web analytics technology. For example, if the TRO provider is a safe transaction service provider, the TRO provider may have access to transaction related information necessary to bind a transaction performance guaranty to a specific transaction or provide ongoing service to a subscriber to the service, e.g., a seller.

Further, if the TRO is the underwriting of the seller's obligations, post-transaction activity may include determining whether a claim has been made by the beneficiary (e.g., the customer), and processing of the claim. Claim processing may require various operations associated with claim information gathering (e.g., gathering information related to a claim received from a beneficiary from various parties about the underlying transaction, agreed terms of the transaction, violation of a term based on which the claim is filed, acquiring relevant information including terms at the closing of the transaction such as the final price for the goods recorded and logged activities of the seller or the customer before or after the closing), dispute resolution (e.g., setting up a corresponding communication forum designated to the claim, monitoring any incoming information placed in the communication forum, collecting evidence in a continuous fashion and reaching a resolution of the claim) resolution execution (e.g., initiating resolution of the claim) and indemnity processing to ensure that the beneficiary is compensated in accordance with the underwritten obligation.

Thus, returning to the invention embodiments, methodologies, systems, components and software are provided that perform web analytics to measure consumer-to-customer conversion continuously throughout surfing, through conversion and past completion of a purchase on-line. In accordance with at least one embodiment, such methodologies, systems, components and software may be utilized to determine efficacy of a plurality of parameters relating to one or more TROs.

FIG. 1 illustrates a framework 100 in which a TRO provider provides one or more TROs for a transaction between a seller 110 and a customer 130. More specifically, the seller 110 may provide one or more products 120 for sale to a consumer/customer 130. The product 120 may be combined with one of a plurality of TROs 150, 160, 170 provided by a TRO provider 140 to provide a plurality of experiences 180, 190, 195 to the consumer/customer 130. Although one or more TROs may be offered to the consumer/customer 130 at the request of the seller 110, the TRO(s) may be purchased by either the seller 110 or the consumer/customer 130.

Moreover, it should be understood that, although FIG. 1 illustrates a variety of TROs being presented to the consumer/customer 130, in accordance with at least one embodiment of the invention, only one TRO may be presented to the consumer/customer 130 as an added enticement to purchase the corresponding product 120. The presentation of a TRO (150, 160, 170) may be made by providing a TRO graphic in a seller's on-line environment (as described below) such that the TRO graphic conveys the option of using the TRO in conjunction with transactions in the on-line environment. Moreover, it should be understood that different TROs (e.g., 150, 160, 170) may be provided to a consumer/customer 130 at different points during an on-line shopping experience for the consumer 130. For example, TRO1 may be presented via a seal graphic, displayed one or more pages in the on-line environment of the seller 110. Alternatively, or in addition, TRO2 may be presented to the consumer/customer 130 at checkout and may, for example, correspond to the option to bond one or more parts of the transaction between the seller 110 and the consumer/customer 130. As such, the graphics associated with TRO1 and TRO2 may be different and convey different but potentially related TROs.

Further, the option to bundle alternative TROs with an identical product (or optionally, to alter parameters associated with TROs) may be utilized to determine the impact of various TROs and associated parameters to determine and/or validate the impact of TRO offerings on behavior of customers/consumers 130.

For example, as explained below, in accordance with at least one invention embodiment, the methodologies, systems, components and software provided by the invention may be utilized to determine efficacy or impact of a plurality of parameters relating to one or more TROs 150, 160, 170. Thus, the effect of experiences 180, 190, 195 on consumer behavior may be determined and compared.

The determination of consumer behavior requires the tracking of such provided by a plurality of different mechanisms, at least one of which being available only in connection with a TRO offering. More specifically, in accordance with at least one embodiment of the invention, consumer behavior is tracked via at least two ways: (1) code provided in connection with one or more presence mechanisms, e.g., TRO graphics, code implementing or associated with such presence mechanisms, etc. provided in sellers' on-line environments (referred to hereafter as "TRO implemented tracking"); and (2) information shared between a TRO provider and sellers provided in connection with the TRO offering (e.g., the information exchanged with the TRO provider regarding an underlying transaction to which the TRO relates, referred to hereafter as "seller reporting"). Thus, a plurality of appropriate tracking methods may be utilized to measure consumer behavior and TRO-related activity including tracking of consumer based on presentation of a graphic associated with the TRO (also referred to as a TRO graphic) and seller provided TRO related information. Optionally, (as explained below) both of these data sources may be combined with cookie or shared object generated data and/or data obtained through conventionally known device printing/mapping technology regarding a consumer for the purposes of resolving conflicting and/or eliminating redundant data. Any one or combination of more than one of these data gathering mechanisms may be used to gather Consumer Behavior Data (CBD).

As mentioned above, one or more TROs may be presented to a consumer in association with a graphic, e.g., an icon, that may include, for example, a hyperlink to TRO related information. Such information may explain the nature of the TRO, terms and conditions, associated price of the TRO, frequently asked questions, procedures for a consumer to take advantage of the TRO, etc. Such a TRO graphic may also be implemented using code such as a Macromedia Flash medium, Silverlight, JavaFX, HyperText Markup Language (HTML), eXtensible Markup Language (XML) or code in other languages capable of rendering a graphical symbol. In general, code in any language that is capable of achieving the task suffices and may include authoring software used to create navigation interfaces, graphic illustrations, and simple interactivity in an antialiased, resizable file format that is small enough to stream across a normal modem connection.

The TRO related graphic code may also be incorporated with an applet (e.g., a Java applet) that may be designed to perform certain data gathering tasks related to the transaction or the TRO. For example, such an applet may automatically extract data related to the underlying transaction. Such data may include, but is not limited to, the date that the transaction negotiation/bidding is closed, the number of days between the posting and the closing, the final price agreed, identification information for the seller and the customer, e.g., name, delivery/billing address, phone numbers, IP address, or other terms consented by both parties. Such an applet may be configured to send the extracted data to a provider of the TRO and/or seller to record such data for future use. Alternatively, the TRO graphic and associated generated code may be incorporated into a posting of the transaction to present the TRO to the consumer.

Therefore, by virtue of the presence of the TRO graphic in a seller's on-line environment, data may be collected regarding the behavior of consumer's viewing pages in the on-line environment. Such information may be used to determine how to increase consumer likelihood to engage with a website by understanding, for example, actual conversion to usage, time spent on a website or particular webpage, CTR (Click Through Rate) to a TRO related environment, e.g., a website associated with a TRO provider, number of page views, etc. Moreover, it may be determined how one or more TROs (such as those illustrated in FIG. 1) impact current and future consumer behavior from point of entry of a consumer in an on-line environment. Further this analysis may continue throughout a consumer's shopping experience, providing, for example, an understanding of shopping cart behavior, payment behavior and post purchase behavior regarding the purchased goods/services. This is because a relationship between the seller and the TRO provider necessitates the sharing of data from the seller to the TRO provider in order to provide the TRO to the customer. Moreover, because the offer and acceptance of a TRO by the consumer enables a direct relationship between the TRO provider and the consumer, additional information may be obtained regarding post-transaction activity of the consumer. This may be obtained, for example, using cookie or shared object technology.

It is foreseeable that consumer activity may be tracked by obtaining the consumer's IP address from the code included within or in conjunction with any TRO graphic provided on any seller's on-line environment. Alternatively, the IP address may be collected via seller reporting, e.g., through an Application Protocol Interface (API; not illustrated) configured for communication between the seller and the TRO provider. Data generated from many data points may be logged as part of seller reporting through, for example, API calls made by a seller to the TRO provider during checkout and payment. Moreover, tracking of interaction with such an API may be performed. However, IP addresses may be shared on corporate networks or when accessing the Internet through specific Internet Service Providers (ISPs). Thus, in order to have more "unique" data which can be cross analyzed with IP address activity, cookies or Macromedia Flash shared objects, or other client side application objects such as JavaFX and Silverlight may be used to append the collected data.

A cookie is a small text file of information that may be attached to a user's hard drive while the user is browsing a website.

A Flash shared object (also referred to merely as a shared object or local shared-object, is essentially a Flash implemented cookie. Flash Shared Objects may be used to store various information including a user's score, favorite color, or a last frame of a web-site visited. Further, Flash shared objects may store a self-identified user name, and the number of times the user visits a particular site. Shared objects are used to store data on the user machine in much the same way that data is stored in a cookie created through a web browser. However, shared objects cannot remember a user's e-mail address or other personal information unless they willingly provide such information.

A cookie can contain information such as user ID, user preferences, archive shopping cart information, etc. Conventionally, cookies can contain Personally Identifiable Information (PII) which is information that can be traced back to a consumer, e.g., name, postal address, e-mail address, telephone number, or Social Security number. However, it may be preferred or in most instances inadvisable to include information that may be used for identity theft in cookies used in association with TROs. Therefore, in accordance with at least one embodiment of the invention, PII may not be stored in cookies or Flash shared objects; rather, a unique visitor identifier may be used that helps to ensure that a TRO provider may securely link to proprietary, confidential or personal information. Use of unique visitor identifiers enables tracking but also confidentiality through the use of look up tables, the contents of which are securely stored. In this way, data is both recorded for analysis but also protected.

The cookie may be a persistent cookie, also called a permanent cookie, a stored cookie, or a tracking cookie, which is a cookie that is stored on a user's hard drive until it expires (persistent cookies are set with expiration dates) or until the user deletes the cookie.

A widespread obstacle to the effective use of cookies is a) negative consumer perception, and b) the easy availability of cookie-blocking tools, which either block the operation of cookies or delete cookies automatically.

In accordance with at least one embodiment of the invention, an alternative to the use of a cookie for tracking is to use a Macromedia Flash shared object, which has the same functionality as a cookie, but does not currently suffer from the limitations of traditional cookies. In addition, the capability of Macromedia Flash shared objects to store greater quantities of data allows greater capacity to record consumer behavior.

Similarly, objects provided by other technology such as Microsoft's Silverlight or JavaFX have similar functionality and capabilities and may be used as alternatives to Flash shared objects or in addition to such objects.

In accordance with at least one embodiment of the invention, a consumer's experience may be tracked from the start through and beyond the completion of a transaction. Conventionally, it is particularly difficult to track a consumer's experience persistently, i.e., track the consumer's activity throughout their interaction with the on-line environment using more than one personal computer. However, using, the combination of TRO implemented tracking, seller reporting and cookie or object-implemented (e.g., Micromedia, Silverlight, JavaFX, etc.) tracking, data may be gathered from multiple sources. This may provide an improved understanding of how to increase conversion rates from search (or other relevant shopping navigation) to product page to purchase, how to decrease the rate of abandoned shopping carts, how to increase the average cart value, how to decrease fraud, how to increase consumer return visits, etc.

For example, in accordance with at least one embodiment of the invention, it may be determined or verified whether the presence and/or presentation parameters of an offered TRO may make consumers more likely to complete the shopping/transaction process, i.e., consumer-to-customer conversion. This is because, by virtue of the TRO provider's relationship with the seller and the TRO implemented tracking, information regarding consumer behavior may be united with information provided by seller reporting to give a full picture of a customer's pre-purchase behavior. Additionally, it may be determined whether the presence and/or presentation parameters of an offered TRO increase average cart value. Further, it may be determined whether the presence and/or type of a TRO decrease fraud. This is because the TRO provider has a direct connection with not only the seller but also the customer (by virtue of his acceptance of the TRO), post transaction consumer behavior activity can be monitored, analyzed and correlated with data provided by TRO implemented tracking and seller reporting; it should be understood that this post-transaction monitoring may be performed using any number of techniques including logging activities performed in connection with the TRO, and/or launching a cookie or Macromedia Flash shared object to gather data on post-transaction CBD.

Further, in accordance with at least one embodiment of the invention, TRO purchase analysis may be performed to identify profitability thresholds and revenue planning for either a seller and/or a TRO provider. Further, on-line environment implementation and integration may be improved based on the improved understanding of the implementation and effect of TROs to a seller's specific on-line environment. For example, CBD may indicate that TROs are more effective for this particular on-line environment when they are provided at check-out rather than throughout the on-line environment.

In accordance with at least one embodiment of the invention, not only the presence and type of TRO, but also properties associated with the presentation of TROs, may be identified and correlated to CBD. Such a level of granularity enables a determination of how a TRO may be most effectively presented to impact consumer behavior. Thus, how the TRO is presented, e.g., the type of TRO or graphic associated with the TRO displayed to consumers may be determined and correlated to consumer behavior.

Figure 2:
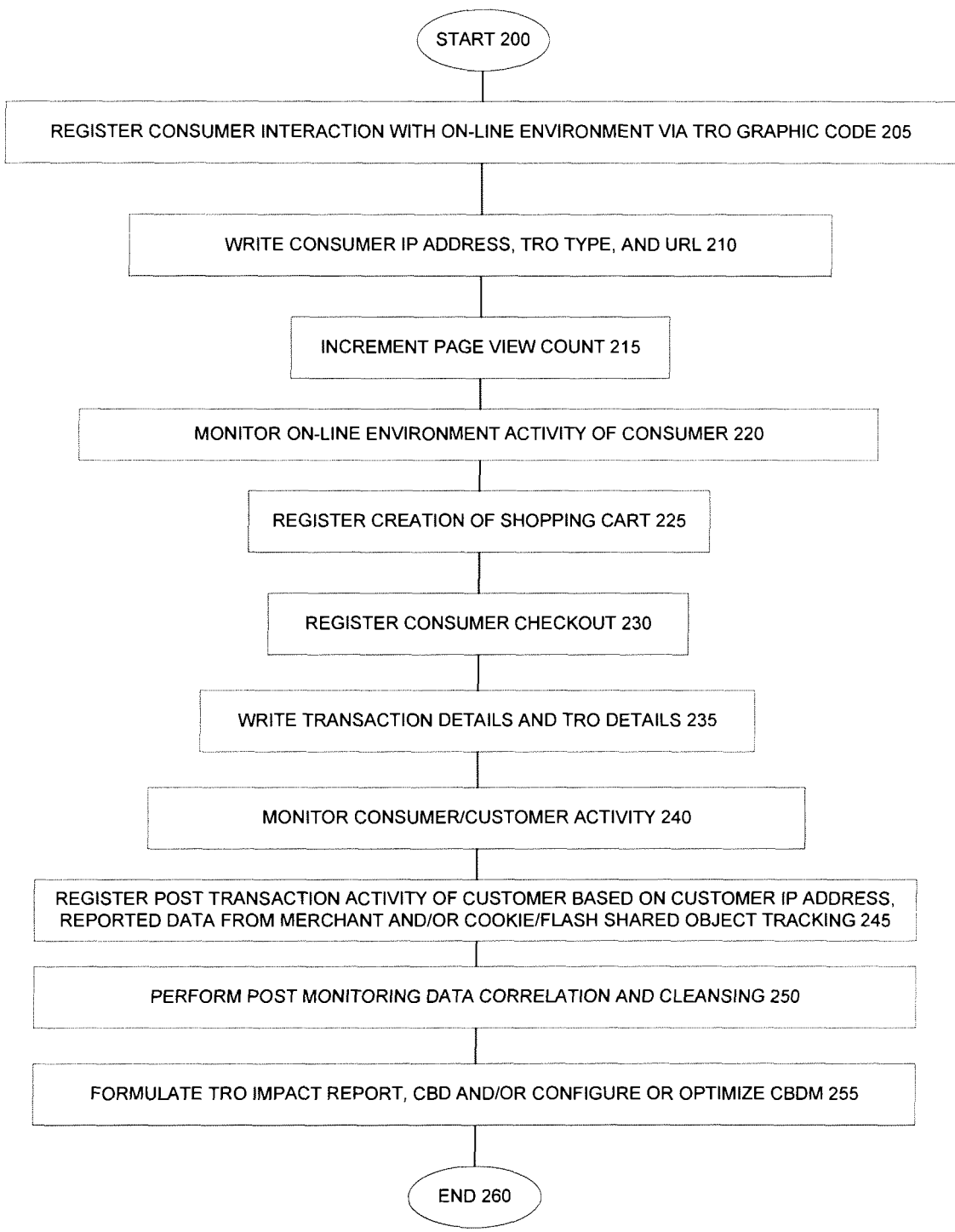
FIG. 2 illustrates one example of operations performed in accordance with at least one embodiment of the invention.

FIG. 2 illustrates one example of operations performed in conjunction with CBD gathering for the purposes of formulating a TRO impact report, or generation of CBD and/or configuration or optimization of a Consumer Behavior Decision Model (CBDM), performed in accordance with at least one embodiment of the invention. As illustrated in FIG. 2, the operations may begin, at 200 and control may proceed to 205, at which consumer interaction with an on-line environment with one or more TRO graphics is registered. Control then proceeds to 210 at which the consumer IP address is written into a log along with information indicating various data about the consumer, e.g., the URL of the root site from which the consumer came, such as a search engine or link from another site, etc.

Thus, when a consumer first visits a seller's on-line environment, it may be assumed that there is no existing cookie or Macromedia Flash object in place for the TRO provider to track consumer behavior. The TRO provider may then write a new cookie file which includes a unique value specific to the consumer's personal computer. This file may also include a unique identifier which may be later used for analysis. For example, by appending the captured client IP address to the TRO provider generated number (if not incremental, the TRO provider generated number may be random) (Ex: 0000001-190.145.1.32), this identifier may be used for analysis purposes. A current consumer IP address may then be used to ensure that the TRO graphic is consistently displayed throughout the consumer experience on the on-line environment.

This file may be appended with any appropriate information when the consumer sees any graphic associated with the TRO served by the TRO provider. Such information may include page view total, type of TRO graphic, interaction with TRO graphic, any value associated with the TRO graphic (e.g., an amount of bond price if the TRO is underwriting of the related transaction), on-line environment visited by consumer, consumer information, such as resolution, operating system version, browser, etc.

Associated cookie(s) or shared objects may include many data points that are persistent (as long as the cookie is not reset or deleted). For every page on which the TRO graphic is displayed, the cookie values may be returned to TRO provider and data within the file may be appended (e.g., total page view, data indicating consumer interaction, etc.) Thus, the code associated with a TRO graphic may modify values of data in the cookie/shared object. Thus, when a TRO graphic is present on a page viewed by the consumer, various pieces of information about the consumer may be gathered including unique ID, IP address, IP address change, TRO type, TRO graphic type, site root, last TRO graphic type, TRO graphic interaction, etc. Although some data may be specific to a last TRO graphic hit, some data points may be persistent and incremented at each TRO graphic impression. Additionally, in accordance with at least one embodiment of the invention, consumer data gathered either via cookies or Macromedia Flash objects may be encoded, e.g., encrypted for further security and client and customer privacy.

Additionally, at 210, or in addition to those operations information regarding the TRO graphic, e.g., the type of graphic, its location in the on-line environment etc. may be stored. For example, TRO graphic placement can significantly impact the effect of the corresponding TRO on consumer behavior. Therefore, capturing reliable data regarding the placement of a TRO graphic on an on-line environment's page(s) enables determination of the effect of the placement on consumer decision making behavior. Thus, in accordance with at least one embodiment of the invention, a conversion from HTML to a JPEG file may be performed so that a screenshot indicating the location of the TRO graphic in an on-line environment's page(s) may be provided. This JPEG file may also include an indication of fold lines (which indicate what is initially displayed to a consumer when a webpage is first loaded) with various resolutions.

Moreover, the code for implementing or triggering display of the TRO graphic may also include functionality to report data indicating the TRO graphic's location within a web page or frame. As a result, this data may be used to analyze various parameters in association with a customer/consumer experience in one or more on-line environments or environment pages.

As a result of this information, customized analysis and verification may be performed for a particular seller by setting a testing period for the seller's on-line environment, establishing the ability to provide a plurality of TROs and associated pricing structures, and establishing persistence at the consumer level.

Returning to the description of FIG. 2, control proceeds to 215, at which a page view count is incremented and control proceeds to 220, at which consumer activity is continuously monitored recording data indicating the activities of the consumer in the on-line environment. Control then proceeds to 225, at which the consumer's creation of a shopping cart in the on-line environment is registered. Various pieces of data may also be registered including, its contents, data and time of creation, location of creation in on-line environment, ordering of contents placed in shopping cart, etc. For example, each update to a cart may create a time stamped log entry.

Control then proceeds to 230, at which consumer checkout is registered; this may include identifying whether and what types of TROs the consumer has accepted and the relevant data and terms and conditions for those TROs. Accordingly, at 235, transaction details and TRO details are written in a log. For example, web logs track every single request for a TRO graphic on any associated seller's on-line environment. Thus, every request from any consumer hitting a page on which the TRO graphic is displayed may be logged in a format that includes the IP address of the consumer, the root URL, the TRO graphic name, browser resolution, etc. Additionally, all web logs may be time stamped.

Subsequently, at 240, consumer/customer activity is monitored by virtue of TRO implemented tracking techniques (explained above), seller reporting and/or cookie or Macromedia Flash shared object implemented tracking. Accordingly, at 245, post transaction activity is registered in a variety of logs. Subsequently, at 250, post monitoring data correlation and cleansing is performed (as explained below) to correlate data received, for example, using the TRO implemented tracking and seller reporting by correlating the two types of data using cookie/Macromedia Flash shared object tracking data. For example, tracking data may be reconciled by removing any data pertaining to a consumer having generated cart or TRO activity from two different IP addresses. This operation may be performed with increased granularity by using client based tracking method (e.g., cookie or Macromedia Flash shared object). To limit the impact of IP address limitations, double tracking (e.g., TRO graphic tracking and API tracking) may be used to clean up data by comparing various parameters in the log data to match up entries, for example, IP address, cart ID, consumer e-mail address, etc.

Returning to FIG. 2, control then proceeds to 255, at which a TRO impact report may be generated to indicate impact and efficacy of one or more TROs offered in the on-line environment and/or parameters associated with such TROs, e.g., placement of TRO graphic, type of TRO graphic, cost of TRO, frequency of placement, duration of TRO, etc.

Alternatively, or in addition, the data provided in 245 may be used to provide CBD that may be used for configuring or optimizing CBDMs or for other uses. Control may then proceed to 260, at which the operations may end temporarily or permanently.

Although operations have been described above wherein a consumers experience may be based on or altered based on the consumer's IP address, it should be understood that the experience(s) may be assigned randomly, based on a predetermined temporal pattern, assigned based on a presumed or determined geographical criterion, temporal criterion, etc. Thus, it should be appreciated that there may be many methods for providing alternating experiences to consumers.

Figure 3:
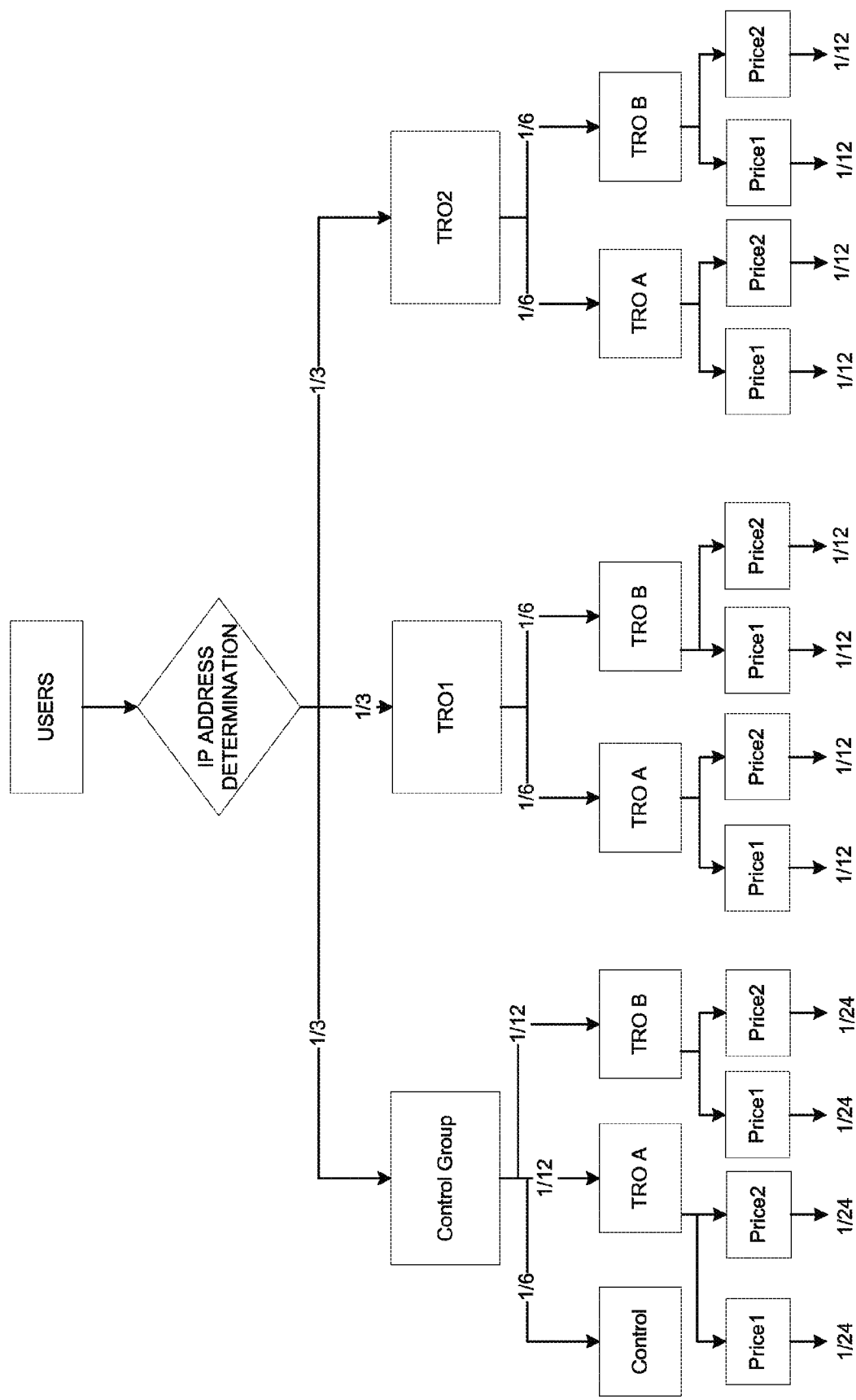
FIGS. 3-4 provide various illustrative examples provided to explain options for multivariate testing of TRO impact.
Figure 4:
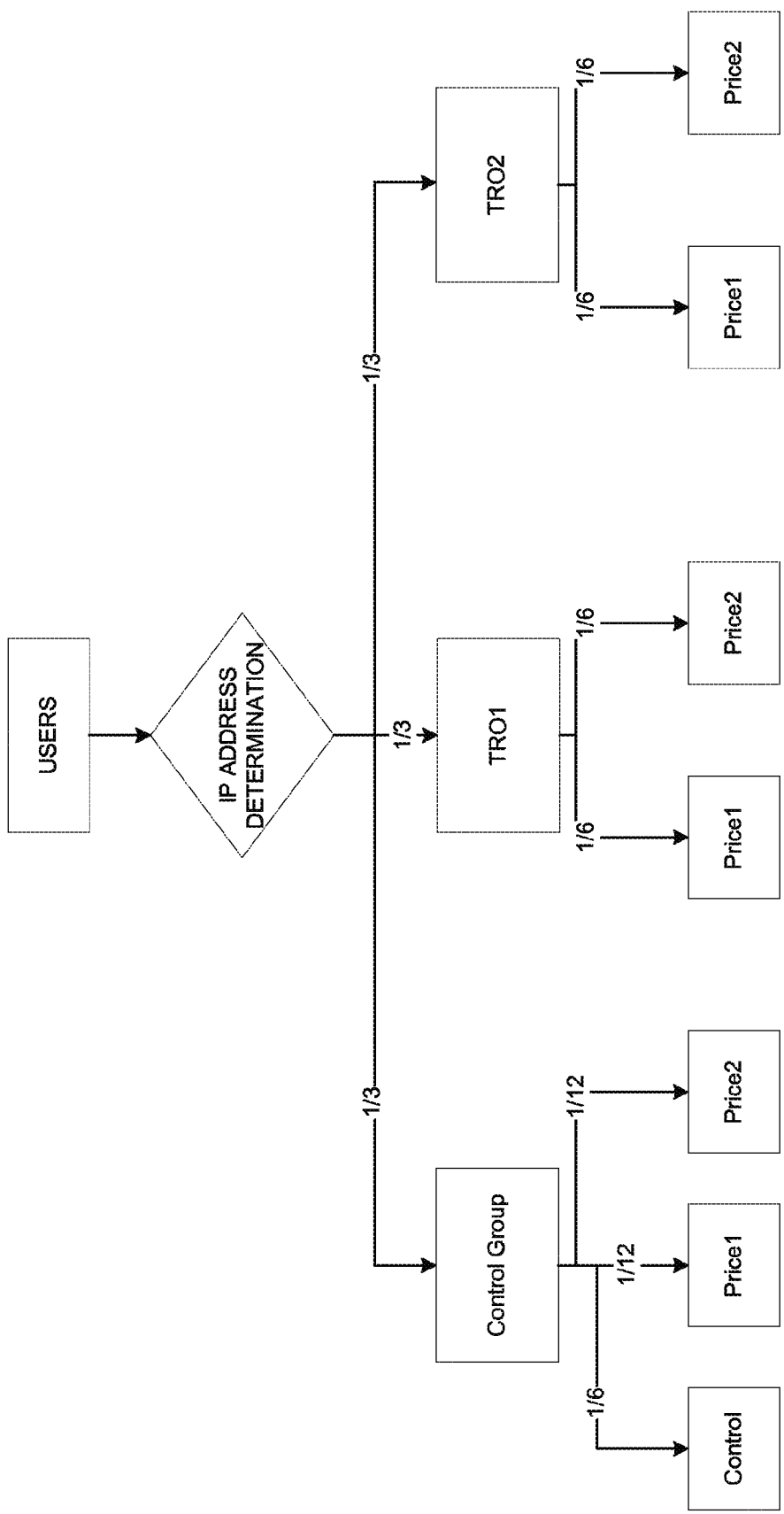

As illustrated in FIGS. 3-4, in accordance with at least one embodiment of the invention, the CBD tracking mechanisms described above may be used to generate data indicating the impact of the presence and/or properties associated with the presentation of one or more TROs on consumer behavior via multivariate (i.e., consideration of multiple parameters simultaneously) testing experiences within a single on-line environment, e.g., seller storefront or market place.

Determining the impact of a TRO presence/presentation requires providing a plurality of consumer TRO experiences from a single on-line environment. Thus, in accordance with at least one embodiment of the invention, a TRO impact verification test may include presenting a plurality of consumer TRO experiences, for example, two experiences to a positive group (with a TRO) and a control group (without a TRO). In such an implementation, experiences may be presented simultaneously to eliminate any affect of timing on the TRO impact.

As a result of the TRO impact verification test, data generated based on TRO implemented tracking may be matched up and combined with seller reported data using cookie/Macromedia Flash shared object tracking. For testing, there is no need to tie a TRO implemented tracking data and the seller reported data. Both elements can be tracked and measured separately. Subsequently, reconciliation and adjustment may be performed through analysis, using the unique visitor identifier IP address and other ways to cleanse the data, e.g., using a consumer's IP address to identify each consumer.

An example of a TRO impact verification test is now provided. On a single seller's on-line environment, three experiences are provided: a control group with no TRO in the on-line environment; a group that is exposed to a first TRO graphic throughout the on-line environment; and a group that is exposed to a second TRO graphic throughout the on-line environment. Once a consumer has been assigned an "experience", the parameters of the experience remains consistent. The initial experience may be defined, for example, by the IP address of the very first interaction with the site. To identify which group a consumer will be placed on a random basis, all consumers with an IP address ending with 0 or 9 are assigned to the control group, all consumers with an IP address ending with 1, 3, 5 or 7 are assigned to the group exposed to the first TRO graphic, and all consumers with an IP address ending with 2, 4, 6 or 8 are assigned to the group exposed to the second TRO graphic. Once, a consumer is assigned to a particular group, any subsequent exposure of the TRO graphic for the consumer throughout the seller's on-line environment during the testing period may be governed by those rules. Consequently, a consumer's IP address is identified, analyzed and stored to determine which group the consumer belongs. The consumer's IP address may be passed on to the TRO provider through an API request from the seller's on-line environment.

It should be appreciated that a TRO validation test may be performed for various parameters associated with a TRO or corresponding TRO graphic. Therefore, it may be determined at what cost a TRO is effective at improving conversion rates, a relationship between TRO cost and conversion rates, etc.

Moreover, various combinations and sub-combinations of parameters may be tested, i.e., multivariate testing. For example, as illustrated in FIG. 3, the effect of more than one TRO (TRO1, TRO2) may be compared against each other and a control group. Placement of users into one of the groups (Control, TRO1, TRO2) may be performed as explained above, based on an IP address of a user.

Further, bundling of multiple TROs may be evaluated by, for example, evaluating the combination of the primary TROs (TRO1, TRO2) with secondary TROs (TROA, TROB). Further, an additional level of variation may be provided by evaluating the impact of the combinations of primary and secondary TROs in combination with different price points associated with the TROs (Price 1, Price 2). It should be understood, that this type of multivariate testing may be used to determine the affect of TROs and/or the affect of TRO graphics and/or parameters associated with TRO graphics (e.g., placement of TRO graphic, type of TRO graphic, cost of TRO, frequency of placement, duration of TRO, etc.) Similarly, FIG. 4 illustrates evaluating the combination of the primary TROs (TRO1, TRO2) with different price points associated with the TROs (Price 1, Price 2). Moreover, it should be understood that the experiences (Experiences 1-3) illustrated in FIG. 1 may conceptually considered equivalent to the various TRO multivariate testing groups illustrated in either FIGS. 3-4. Thus, the term experience may be thought of as pertaining to a particular TRO, TRO graphic, or set of TRO presentation parameters.

For each group, a TRO verification test may include rules for each testing period, for each seller. These may include, number of groups, in addition to control group (no TRO for control group), display rules, which establish what consumer IP addresses are assigned to which groups, maximum duration of test (based, for example, on a volume of transactions), etc.

In accordance with at least one embodiment of the invention, modification of TRO verification parameters may be performed, for example, to remove a parameter if, data provided by the test indicate that data regarding the parameter is non-determinative or ineffectual on consumer behavior. As a result, a TRO verification test may be reconfigurable in order to optimize the test while minimizing impact on a seller's on-line environment. For example, with reference to FIG. 3, if after two weeks of testing, the impact of TRO2 clearly outranks TRO1, the TRO verification parameters may be adjusted or reconfigured to provide a test bundling TRO2 with TROA or TROB and associated price points. Thus, TRO1 is no longer part of the TRO verification test, but testing may continue with only a single primary TRO and multiple secondary TROs.

Figure 5:
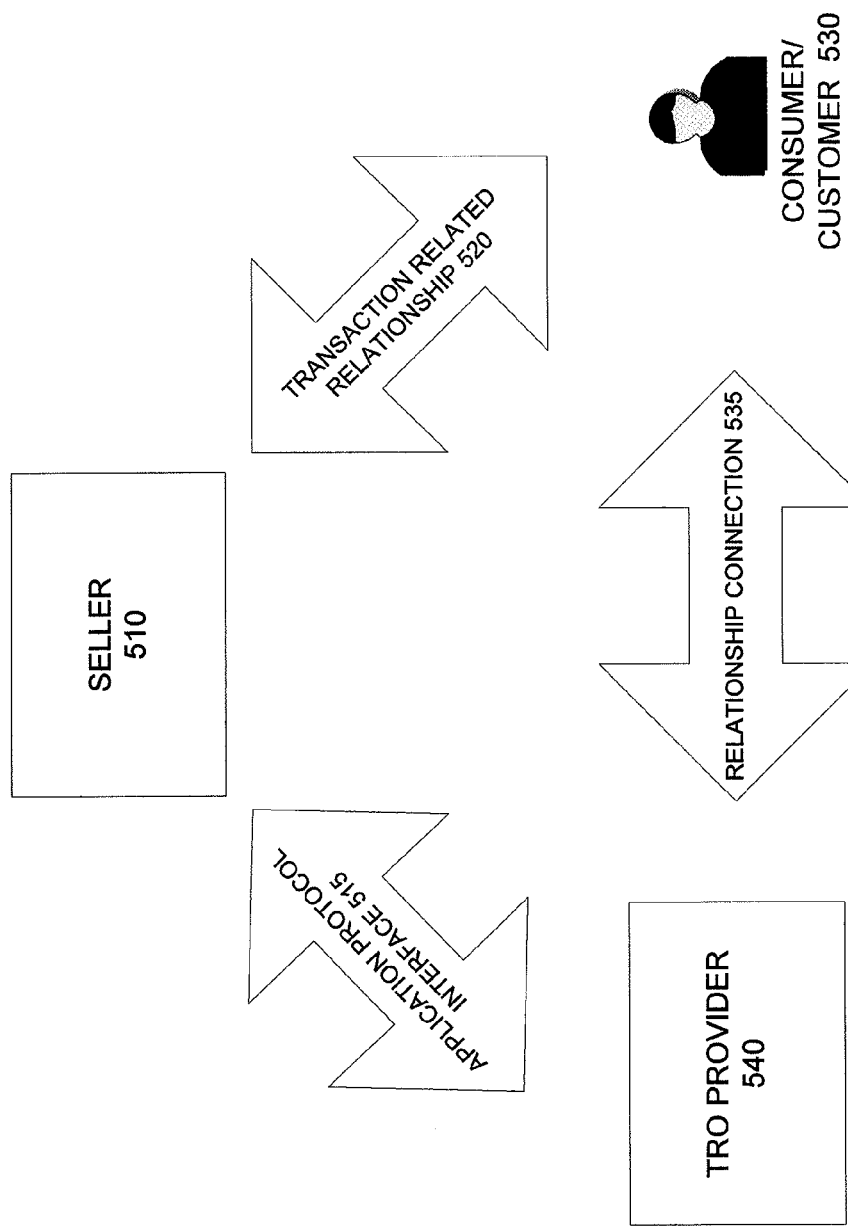
FIG. 5 illustrates how an exemplary seller and an exemplary TRO provider may interact and share information to enable delivery of TRO related information to the seller's on-line environment, process requests for TROs originating in that environment, and report information regarding TRO efficacy as well as CBD to the seller in accordance with at least one embodiment of the invention.

As illustrated in FIG. 5, in accordance with at least one invention embodiment, a seller 510 and a TRO provider 540 may interact and share information to enable delivery of TRO related information to the seller's on-line environment, process requests for TROs originating in that environment, and report information regarding TRO efficacy as well as CBD to the seller 510. Accordingly, one or more connections and/or interfaces, e.g., Application Protocol Interface (API) 515, may be provided to enable such communication. Moreover, the seller 510 has a transaction related relationship 520 with the consumer/customer 530 by virtue of the transaction; as a result the seller 510 has provides access to CBD regarding consumer/customer 530. Additionally, once a consumer/customer 530 has accepted a TRO, there is an additional relationship connection 535 between the consumer/customer 530 (via, e.g., cookie/Macromedia Flash shared object tracking) and the TRO provider 540 as well as between the seller 510 and the TRO provider 540. As a result, the TRO provider is able to receive, analyze and correlate CBD received from both the seller 510 and the consumer/customer 530. Further, by nature of the TRO implemented tracking, seller reporting and cookie/Macromedia Flash shared object tracking data, the TRO provider 540 receives, analyzes and correlates CBD data prior to, during and/or post transaction. In accordance with at least one embodiment of the invention, a seller may be provided with an interface that enables selection of one or more TRO related parameters to be tested.

In accordance with at least one embodiment of the invention, methodologies, systems, components and software may be utilized to configure one or more CBDMs and/or generate CBD. As a result, it should be appreciated that the invention enables capture of appropriate data to allow TRO analysis, Cost Per Action (CPA) modelling and web analytics modelling to identify how many visitors visited their site, how many of those visitors were unique visitors, how they came to the site (i.e., if they followed a link to get to the site or came there directly), what keywords they searched with on the site's search engine, how long they stayed on a given page or on the entire site, what links they clicked on, whether and what they purchased, whether and what TRO was provided to the visitor, particular parameters associated with the TRO, what delivery mechanism they selected, and when they left the site. Thus, in accordance with at least one embodiment of the invention, web analytic software may be provided that can be used to monitor the effect of one or more TROs on conversion rate for the source search/keyword, seller, product line, brand, product type, etc.

Further, in accordance with at least one embodiment of the invention, methodologies, systems, components and software may be utilized to provide an audit function for, e.g., Cost Per Conversion (CPC) modelling and/or billing. Recognizing that the advertisement industry has been plagued with problems of determining how to identify the size of an audience exposed to advertising material. CPC has made this determination easier, but in some ways, CPC makes the problem worse because, often, a seller/advertiser and a publisher often disagree due to basic technical challenges related to lost traffic between click and site arrival. Publishers conventionally reject the notion of relying upon the advertisers to self-report traffic because of the obvious moral hazard associated with self-reporting. However, functionality provided in accordance with at least one invention embodiment may be used to provide an unbiased, reporting mechanism for actual traffic/audience.

Further, in conjunction with the configuring of CBDMs, it should be appreciated that some amount of CBD may be utilized to generate an initial CBDM while additional CBD may be analyzed to optimize and/or reconfigure the CBDM on a continuous or periodic basis. Accordingly, CBD generated by the invention and resulting CBDMs may be used in conjunction with various conventionally known marketing techniques, for example, those described in the background and disclosure of U.S. Pub. 20050222906, entitled "System and Method of Targeted Marketing," hereby incorporated by reference.

Also, in accordance with at least one embodiment of the invention, the CBDM data may be used to provide or support contextual advertising operations wherein advertising is directed to a consumer or group of consumers based on an improved understanding of their behavior gained from tracking consumer behavior in accordance with the invention. Accordingly, contextual advertising could be based on CBD gathered post-transaction fulfilment. For example, CBD may be generated in accordance with invention embodiments that indicate that individuals who purchased a particular type of computer equipment and were offered and accepted a TRO from a particular seller's on-line environment also purchased (from a separate, unaffiliated on-line environment) additional memory or graphics components and/or game programs. With that information, the seller may be able to identify what product/service bundlings may be provided to improve consumer experience and motivate return shoppers. Additionally, such information may enable the seller to determine with which other on-line sellers partnering may be beneficial.

It should be understood that invention embodiments have been described in relation to conversion, e.g., conversion from consumer-to-customer. However, it should be understood that conversion may refer to any other type of conversion. Moreover, it should be understood that consumer-to-consumer conversion is intended to refer to individuals who purchase products and/or services (e.g., registration for service that may be provided over the Internet, over a mobile phone or in a physical form).

Although invention embodiments have been explained generally without particular reference to specific TROs provided or associated benefits conferred to a customer, the following explanation of one particular application provides an increased understanding of invention utility when a TRO is provided by a safe transaction service provider that provides a TRO in the form of a transaction performance guaranty for a transaction involving a consumer receives the safe transaction service through an underwriting process. In such an example, the underlying transaction involves a buyer (e.g., consumer/customer 130 illustrated in FIG. 1) and a seller (e.g., seller 110 illustrated in FIG. 1) 220. There may be a contract between the buyer and seller including a plurality of contractual terms associated with the underlying transaction. Such terms may include, but need not be limited to, a description of goods, a sale price, a delivery date, a specified payment method, and certain quality measures related to the goods involved. According to such contractual terms, the buyer may have a duty to make a payment for the goods involved and the seller may have a duty to deliver the goods.

Thus, a safe transaction service provider (e.g., TRO provider 140 illustrated in FIG. 1) may provide a transaction performance guaranty service to a party (either the buyer or the seller) involved in the transaction. The party receiving the transaction performance guaranty service is a service subscriber, i.e., a party who pays a fee to subscribe to the services of the safe transaction service provider, which may be either the buyer or the seller. The subscription may be termed with respect to a predetermined fixed period (e.g., one month) or may be termed with respect to a total coverage in terms of a dollar amount, or a hybrid.

The transaction performance guaranty service, which may be obtained for a fee, may also provide a separate performance guaranty on behalf of its subscriber for each transaction involving the subscriber. The guaranty may be exercised in case of default by a party to the transaction. A default may be defined as a violation of a term associated with a transaction agreement. For example, if the seller subscribes to the performance guaranty service and fails to deliver goods in a particular transaction, a buyer involved in the same transaction may exercise the guaranty and file a claim to the safe transaction service provide.

A transaction performance guaranty service agreement may provide an indemnity clause, which requires a service subscriber to indemnify, under certain condition, the safe transaction service provider for a payout that it has made. For example, if a claim is filed against the service subscriber who is subsequently determined to be at fault and the safe transaction service provider compensated the party who filed the claim, the safe transaction service provider may seek reimbursement from its subscriber.

The transaction performance guaranty may be provided in a variety of different forms, e.g., a surety bond, a specialized bank guaranty, a specialized insurance policy, or in a form of a safe transaction guaranty. The safe transaction service provider may provide various forms of a performance guaranty.

When a transaction closes, the focus regarding an underlying transaction may shift from negotiation/bidding to actual performance. All of the parties may not be known until the transaction closes. For example, in an auction where the seller is a subscriber of the transaction performance guaranty service, it is not clear until there is a successful bidder at the close of the auction who the buyer will be. The safe transaction service provider may not be certain who will be the beneficiary under the performance guaranty provided on behalf of the subscriber (auction seller). Therefore, the safe transaction service provider may actually issue a performance guaranty only after the underlying transaction is closed and the performance guaranty can be provided to the appropriate party, such as the successful auction bidder.

Under a seller's transaction performance guaranty, when the seller violates a term regarding the transaction (e.g., fails to deliver the goods after the buyer made the payment), the buyer may file a claim with the safe transaction service provider. In other situations, the buyer may file a claim merely based on a belief that the seller has violated some agreed terms of the transaction. If the safe transaction service provider determines that the seller is at fault, it compensates the buyer. Subsequently, the safe transaction service provider sends an indemnity request to the seller according to the transaction performance guaranty service agreement. Finally, the seller may indemnify the safe transaction service provider in compliance with the service agreement.

The safe transaction service provider may determine service subscribers according to their qualifications measured using different approaches. The safe transaction service provider may underwrite each applicant requesting different services. There may be a separate and distinct underwriter involved in the process or the underwriter may be part of the safe transaction service provider. Thus, the underwriter may need to communicate with different entities to gather relevant information in order to make a qualification decision about each service applicant. It may gather credit information from different credit agencies. It may also collect, either internally or externally, ratings of a seller from various rating information sources. In some situations, the underwriter may also examine different governmental archives to identify court proceedings in which an applicant is a party indicating the applicant's alleged or convicted wrongful conduct. Furthermore, the underwriter may also look up data from other public information sources that may reflect the qualification of an applicant. For instance, there may be a public list posted on a website that lists all sellers who have participated in fraud in prior commercial activities. The underwriter may be a person, a corporation that carries out the underwriting process either manually or automatically through a computer application program or semi-automatically.

Thus, the safe transaction service provider may choose to offer its service only to applicants who have shown a certain level of trustworthiness based on information collected from different sources. This minimizes the potential risk borne by the safe transaction service provider. Alternatively, the safe transaction service provider may also provide safe transaction related services on behalf of other business entities. For example, the safe transaction service provider may operate as an agency for an underwriter such as an insurance company. In addition, it may represent a plurality of independent business entities to offer, execute, and maintain safe transaction related services.

In such an example, where a TRO provider is a safe transaction service provider. Two types of TROs may be presented to a consumer throughout their experience at a seller's "bonded" on-line environment: a seal (certified or bonded), which may be displayed throughout the on-line environment and indicate that an associated seller(s) is either a certified seller or a bonded seller; and a bond opt-in TRO, which may provide the consumer with the opportunity to purchase a bond during a checkout process for a transaction within the on-line environment. The seal TRO may be served, for example, dynamically by the safe transaction related service provider and arbitrarily or purposefully placed in the seller's on-line environment, while the bond opt-in TRO may be served and placed, for example, by the partner.

While this invention has been described in conjunction with the specific embodiments outlined above and particular examples used to illustrate relative and absolute utility of the invention in connection with on-line environments, it is evident that many alternatives, modifications and variations will be apparent to those skilled in the art. Accordingly, the various embodiments of the invention, as set forth above, are intended to be illustrative, not limiting. Various changes may be made without departing from the spirit and scope of the invention.

For example, although the above-described invention embodiments have been described as receiving information via cookies/shared objects, from sellers' on-line environments, etc., it should be appreciated that at least one invention embodiment may be configured to gather information using what is sometimes referred to as "digital fingerprinting," or "deviceprint" technology, wherein a consumer's device (e.g., their personal computer) may be uniquely identified using any one or combination of more than one proprietary methods wherein hardware, software and network information is gathered to create a unique profile or digital fingerprint for each device that accesses an online network. Because such digital fingerprints are extremely accurate and resistant to manipulation, this implementation has particular value.

Additionally, it should be appreciated that the invention has been described using various terms that may be used interchangeably or with reference to one another. For example, the term "buyer" may be used interchangeably with "consumer" or "customer" depending on the context. Further, although invention embodiments have been described in relation to the term "seller," it should be understood that the term "seller" may refer to any type of seller including merchants, market/clearinghouse/reselling environment providers, etc.

Further, in accordance with at least one embodiment of the invention, a spider or robot may be used to index sellers' on-line environments to verify that TRO graphics are properly placed and functioning. Accordingly, the spider (which may be implemented as a computer program that locates and analyzes web documents, FTP archives, and Gopher documents) may be used to generate data regarding on-line environments, and the presence and presentation of TROs. This information may be compared with and/or cross references with data generated by, for example, API tracking, TRO tracking and cookie tracking to reduce extraneous data by matching various parameters to link data and eliminate redundancies.

Also, in accordance with at least one embodiment of the invention, TROs may be provided in conjunction with an affiliate program, so that consumer behavior may be tracked prior to the consumer visiting a seller's on-line environment. In such an embodiment, the TRO graphic may be provided as an indication of participation in such an affiliate program. As a result, tracking of consumer behavior may be extended to all sellers participating in the affiliate program. As a result, revenue may be distributed in connection with the affiliate program based on actual conversions from surfing to purchasing rather than merely on clicks of page views.

Further, it should be appreciated that the code utilized by various invention embodiments may be served by a seller in their own on-line environment or served by a TRO provider from a remote location, which may be coupled to the on-line environment and be implemented using one or more servers. Further, it should be understood that any or all of the software and associated functionality utilized to analyze CBD may be included in a seller's on-line environment and/or components operated by or under the direction of a TRO provider.

As a result, it will be apparent for those skilled in the art that the illustrative embodiments described are only examples and that various modifications can be made within the scope of the invention as defined in the appended claims.

The invention claimed is:

1. A method for effectively providing a sales transaction related offering to at least one consumer via an on-line environment for the purpose of providing an advertisement to at least one consumer to purchase one or more products or services via the on-line environment, the method comprising:
   advertising availability of the sales transaction related offering to the at least one consumer prior to the consumer making a purchase via the on-line environment, the advertising being provided to the at least one consumer via a computer coupled to a server via at least one communication network that at least partially implements the on-line environment;
   monitoring, by a processor, consumer behavior of the at least one consumer in the on-line environment using code associated with the sales transaction related offering to generate consumer behavior data; and
   analyzing, by at least one server, the consumer behavior data to determine an impact of a plurality of parameters relating to the sales transaction related offering,
   wherein the analysis of the consumer behavior data provides information indicating whether or to what extent the sales transaction related offering is an incentive to at least one consumer to purchase one or more products or services via the on-line environment,
   wherein the monitoring consumer behavior is performed past completion of at least one sales transaction performed in the on-line environment, and
   wherein the sales transaction related offering includes assuming some or all of one or more party's obligations in the purchase to the benefit of the at least one consumer.

2. The method of claim 1, wherein the monitoring consumer behavior is performed continuously from the at least one consumer's first exposure to the on-line environment.

3. The method of claim 1, wherein the consumer behavior data indicates details pertaining to a conversion of the at least one consumer to a customer in the on-line environment.

4. The method of claim 3, wherein the consumer behavior data indicates whether the at least one consumer accepted the sales transaction related offering in connection with at least one sales transaction.

5. The method of claim 1, wherein the consumer behavior data indicates whether the at least one consumer accepted one or more sales transaction related offerings.

6. The method of claim 1, further comprising:
   identifying consumer behavior data from at least two different sources to identify consumer behavior data that pertains to a same consumer; and
   correlating the consumer behavior data pertaining to the same consumer.

7. The method of claim 6, further comprising deleting redundant data in the consumer behavior data pertaining to the same consumer.

8. The method of claim 6, wherein the at least two different sources include seller reported data and a consumer behavior tracking mechanism.

9. The method of claim 6, wherein the consumer behavior tracking mechanism is a shared object.

10. The method of claim 6, wherein the consumer behavior tracking mechanism is a cookie.

11. The method of claim 6, wherein the at least two different sources include code provided in the on-line environment provided in connection with the sales transaction related offering, the code being executed to monitor and record consumer behavior.

12. The method of claim 11, wherein the sales transaction related offering is the underwriting of one party's obligations in a sales transaction.

13. The method of claim 1, wherein the assuming of some or all of the one or more party's obligations is providing dispute resolution.

14. The method of claim 13, wherein the providing of dispute resolution includes facilitating actual performance of one of the parties' obligations.

15. The method of claim 1, wherein the sales transaction related offering includes assuming some or all of one or more party's obligations in the purchase to reduce risk to the consumer.

16. A method for performing systematic analysis of consumer behavior data to configure or reconfigure one or more consumer behavior decision models, the method comprising:

monitoring behavior of a plurality of consumers prior to, during and subsequent to at least one sales transaction for each consumer performed in an on-line environment to generate consumer behavior data, the monitoring being at least partially performed via a server coupled to a computer operated by the consumer via at least one communication network that at least partially implements the on-line environment;

analyzing, by at least one server, the generated consumer behavior data to configure or reconfigure one or more consumer behavior decision models, wherein the one or more consumer behavior decision models predict whether or to what extent at least one consumer is likely to purchase one or more products or services, wherein the monitoring consumer behavior is performed past completion of at least one sales transaction performed in the on-line environment, and wherein the sales transaction includes assuming some or all of one or more party's obligations in the purchase to the benefit of the at least one consumer.

17. The method of claim 16, wherein the monitoring consumer behavior is performed continuously from consumers' first exposure to the on-line environment.

18. The method of claim 16, wherein the consumer behavior data indicates details pertaining to at least one conversion of a consumer, included in the plurality of consumers, to a customer in the on-line environment.

19. The method of claim 18, wherein the consumer behavior data indicates whether at least one consumer in the plurality of consumers accepted one or more sales transaction related offerings in connection with the at least one sales transaction.

20. The method of claim 16, wherein the consumer behavior data indicates whether at least one consumer in the plurality of consumers accepted one or more sales transaction related offerings.

21. The method of claim 16, further comprising:
identifying consumer behavior data from at least two different sources to identify consumer behavior data that pertains to a same consumer included in the plurality of consumers; and
correlating the consumer behavior data pertaining to the same consumer.

22. The method of claim 21, further comprising deleting redundant data in the consumer behavior data pertaining to the same consumer, 23. The method of claim 21, wherein the at least two different sources include seller reported data and a consumer behavior tracking mechanism.

24. The method of claim 23, wherein the consumer behavior tracking mechanism is a shared object.

25. The method of claim 23, wherein the consumer behavior tracking mechanism is a cookie.

26. The method of claim 23, wherein the at least two different sources include code provided in the on-line environment provided in connection with at least one sales transaction related offering, the code being executed to monitor and record consumer behavior.

27. The method of claim 26, wherein the at least one sales transaction related offering is the underwriting of one party's obligations in a sales transaction.

28. The method of claim 16, wherein the assuming of some or all of the one or more party's obligations is providing dispute resolution.

29. The method of claim 28, wherein the providing of dispute resolution includes facilitating actual performance of one of the parties' obligations.

30. The method of claim 16, wherein the sales transaction related offering includes assuming some or all of one or more party's obligations in the purchase to reduce risk to the consumer.

31. A system that provides a sales transaction related offering to at least one consumer via an on-line environment for the purpose of providing an advertisement to at least one consumer to purchase one or more products or services via the on-line environment comprising:

a computer coupled to a server, that communicate over at least one communication network that at least partially implements the on-line environment, that advertises availability of the sales transaction related offering to the at least one consumer prior to the consumer making a purchase via the on-line environment;

a processor configured to monitor consumer behavior of the at least one consumer in the on-line environment using code associated with the sales transaction related offering to generate consumer behavior data; and at least one server configured to advertise the consumer behavior data to determine an impact of a plurality of parameters relating to the sales transaction related offering, wherein the analysis of the consumer behavior data provides information indicating whether or to what extent the sales transaction related offering is an incentive to at least one consumer to purchase one or more products or services via the on-line environment, wherein the monitoring consumer behavior is performed past completion of at least one sales transaction performed in the on-line environment, and wherein the sales transaction related offering includes assuming some or all of one or more party's obligations in the purchase to the benefit of the at least one consumer.

* * * * *